US012608165B2

(12) United States Patent
Okamoto

(10) Patent No.: US 12,608,165 B2
(45) Date of Patent: Apr. 21, 2026

(54) IMAGE FORMING APPARATUS, IMAGE FORMING METHOD, AND NON-TRANSITORY COMPUTER READABLE MEDIUM

(71) Applicant: FUJIFILM BUSINESS INNOVATION CORP., Tokyo (JP)

(72) Inventor: Akira Okamoto, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 368 days.

(21) Appl. No.: 18/177,791

(22) Filed: Mar. 3, 2023

(65) Prior Publication Data

US 2024/0069838 A1 Feb. 29, 2024

(30) Foreign Application Priority Data

Aug. 24, 2022 (JP) ................................. 2022-133218

(51) Int. Cl.
*G06F 3/12* (2006.01)
(52) U.S. Cl.
CPC .......... *G06F 3/1267* (2013.01); *G06F 3/1207* (2013.01); *G06F 3/1274* (2013.01)
(58) Field of Classification Search
None
See application file for complete search history.

(56) References Cited

U.S. PATENT DOCUMENTS

| | | | |
|---|---|---|---|
| 2003/0151768 A1* | 8/2003 | Iida ........................... | H04N 1/34 |
| | | | 358/1.15 |
| 2016/0034231 A1* | 2/2016 | Miyake .............. | G06K 15/1889 |
| | | | 358/3.28 |
| 2018/0113655 A1* | 4/2018 | Sawata .................. | G06F 3/1258 |

FOREIGN PATENT DOCUMENTS

JP 2007-025970 A 2/2007

* cited by examiner

*Primary Examiner* — Darryl V Dottin
(74) *Attorney, Agent, or Firm* — Oliff PLC

(57) ABSTRACT

An image forming apparatus includes a processor configured to: retain a print command having a print deadline set therefor and received from a user, execute a billing process related to a printing process when the printing process related to the print command is completed in the image forming apparatus that has acquired the print command, and be communicable with a print server that deletes the print command if the printing process related to the print command is not executed before the print deadline is reached; receive the print command from the print server and cause a memory to store the print command; and not execute the printing process related to the print command if an execution order for the print command is received after the print deadline for the print command received from the print server has passed.

7 Claims, 5 Drawing Sheets

| JOB ID | PRINT DEADLINE | NOTIFICATION DEADLINE | NOTIFICATION-DESTINATION INFORMATION |
|---|---|---|---|
| 1001 | 3/1/2022 17:00 | 2/28/2022 17:00 | aaa@xxx.yyy.co.jp |
| 1936 | 3/2/2022 10:00 | 3/1/2022 10:00 | – |
| 3814 | 3/3/2022 15:00 | 3/2/2022 15:00 | bbb@xxx.yyy.co.jp |
| ... | ... | ... | ... |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-133218 filed Aug. 24, 2022.

BACKGROUND

(i) Technical Field

The present disclosure relates to image forming apparatuses, image forming methods, and non-transitory computer readable media.

(ii) Related Art

In a print system proposed in the related art, a user transmits a print command (i.e., a print job) to a print server (e.g., a cloud server), an image forming apparatus acquires the print job from the print server, and the print system executes a printing process related to the print job in response to the print command from the user.

For example, Japanese Unexamined Patent Application Publication No. 2007-025970 discloses a print system including a print server that spools and manages a print job and also including an image processing apparatus. The image processing apparatus notifies the print server of a processing result of the print job, and the print server deletes the spooled print job based on the processing result of the print job.

SUMMARY

In a print system in which a print server transmits a print command received from a user to an image forming apparatus and the image forming apparatus executes a printing process related to the print command, the print server sometimes executes a billing process related to the printing process based on a notification received from the image forming apparatus and indicating that the printing process is completed.

If the printing process related to the print command is not executed for a predetermined time period from when the print command is received, the print server may conceivably perform a process for deleting the spooled print command. In this case, the print command is transmitted to the image forming apparatus before the print server deletes the print command. The image forming apparatus may conceivably execute the printing process related to the print command after a predetermined time period elapses from when the print server receives the print command (i.e., after the print command is deleted from the print server).

Then, although the image forming apparatus provides the print server with a notification indicating that the printing process is completed, the print command has already been deleted from the print server. Thus, the print server is not able to identify the print command related to the printing process. This is problematic in that the billing process related to the printing process is not executable.

Aspects of non-limiting embodiments of the present disclosure relate to suppression of a situation where a print server is not able to execute a billing process related to a printing process in a print system including the print server that receives a print command from a user and an image forming apparatus that executes the printing process related to the print command received from the print server.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus comprising a processor configured to: retain a print command having a print deadline set therefor and received from a user, execute a billing process related to a printing process when the printing process related to the print command is completed in the image forming apparatus that has acquired the print command, and be communicable with a print server that deletes the print command if the printing process related to the print command is not executed before the print deadline is reached; receive the print command from the print server and cause a memory to store the print command; and not execute the printing process related to the print command if an execution order for the print command is received after the print deadline for the print command received from the print server has passed.

BRIEF DESCRIPTION OF THE DRAWINGS

An exemplary embodiment of the present disclosure will be described in detail based on the following figures, wherein:

FIG. 3 schematically illustrates an example of the contents of a server deadline management table and an apparatus deadline management table;

DETAILED DESCRIPTION

Figure 1:
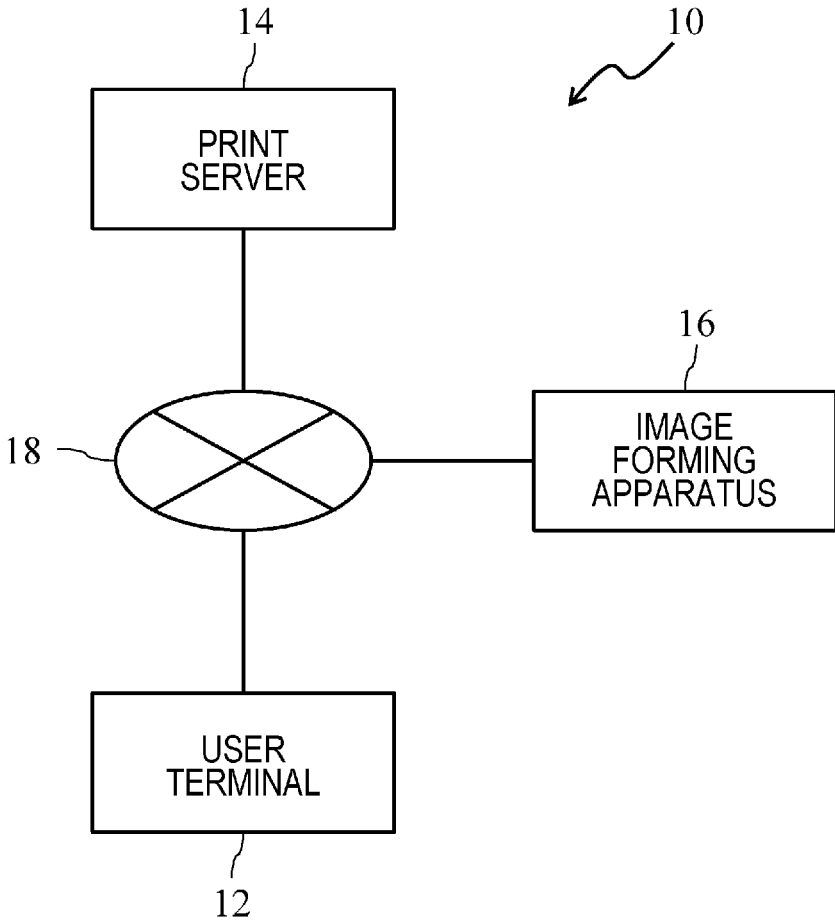
FIG. 1 schematically illustrates the configuration of an image forming system according to this exemplary embodiment.

FIG. 1 schematically illustrates the configuration of an image forming system 10 according to an exemplary embodiment. The image forming system 10 includes at least one user terminal 12 to be used by at least one user, a print server 14, and at least one image forming apparatus 16. The user terminal 12, the print server 14, and the image forming apparatus 16 are connected to one another in a communicable manner via a communication line 18, such as a local area network (LAN) or a wide area network (WAN).

The user terminal 12 is, but not limited to, a computer, such as a personal computer, a tablet terminal, or a smartphone. The user terminal 12 includes a communication interface for communicating with the print server 14 and the image forming apparatus 16 via the communication line 18, an input interface for receiving a user command, a display that displays various screens, a memory for storing data, and a processor that executes various processes.

Figure 2:
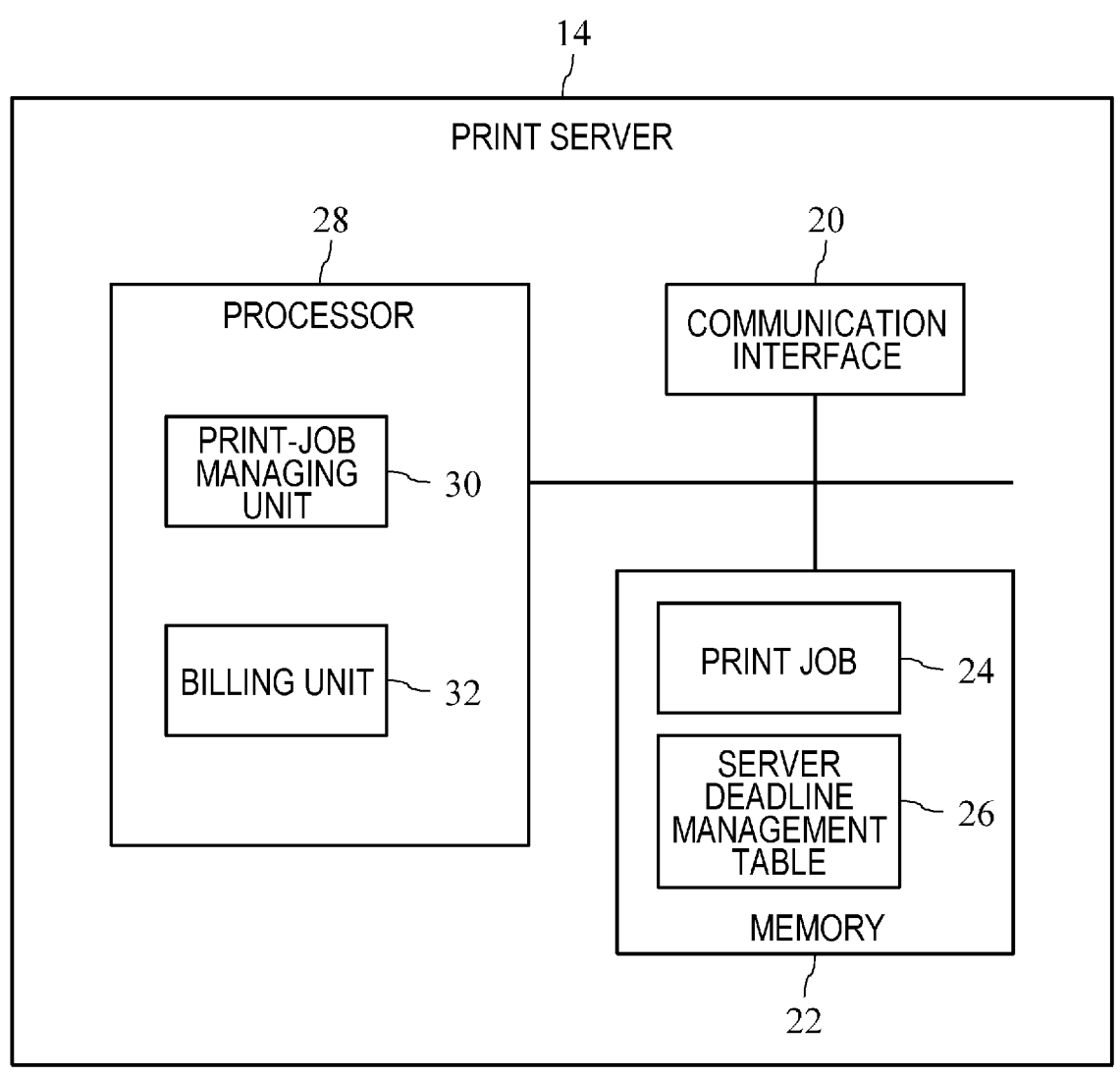
FIG. 2 schematically illustrates the configuration of a print server according to this exemplary embodiment.

FIG. 2 schematically illustrates the configuration of the print server 14. The print server 14 may be constituted of a single computer or multiple computers operating in cooperation with each other. The print server 14 receives and manages a print job as a print command from the user terminal 12. Moreover, when a printing process related to the print job is completed in the image forming apparatus 16 that has acquired the print job, the print server 14 executes a billing process related to the printing process. The details of the print server 14 will be described below with reference to FIG. 2.

A communication interface 20 is constituted of, for example, a network interface card (NIC). The communication interface 20 exhibits a function for communicating with the user terminal 12 and the image forming apparatus 16 via the communication line 18.

A memory 22 includes a hard disk drive (HDD), a solid state drive (SSD), an embedded multi-media card (eMMC), a read only memory (ROM), or a random access memory (RAM). As shown in FIG. 2, the memory 22 stores a print job 24 and a server deadline management table 26 received from the user terminal 12.

FIG. 3 illustrates an example of the contents of the server deadline management table 26. In the server deadline management table 26, a job ID for uniquely identifying the print job 24 and a print deadline for the print job 24 are associated with each other. Specifically, each print job 24 has a print deadline set therefor.

For example, the print deadline may be uniformly set to a time point corresponding to a first predetermined time period (e.g., three days) after the print server 14 receives the print job 24 from the user terminal 12. As will be described in detail later, the first predetermined time period may be variable in response to a request from the image forming apparatus 16. Alternatively, the user may individually set the print deadline for the print job 24 when performing a print setting process related to the print job 24.

As will be described later, when the print deadline for the print job 24 is reached, the print server 14 deletes the print job 24 from the memory 22 even if the printing process related to the print job 24 is not completed.

Furthermore, in the server deadline management table 26, a notification deadline may be associated with each job ID. Specifically, each print job 24 may have a notification deadline set therefor. The notification deadline for a certain print job 24 is earlier than the print deadline for the print job 24. For example, the notification deadline may also be uniformly set to a time point corresponding to a second predetermined time period (e.g., one day) prior to the print deadline. As will be described in detail later, the second predetermined time period may be variable in accordance with a command from the user. Alternatively, the user may individually set the notification deadline for the print job 24 when performing a print setting process related to the print job 24.

Moreover, in the server deadline management table 26, a notification-destination information indicating a notification destination of a user who has transmitted the print job 24 to the print server 14 may be associated with the job ID. Specifically, notification-destination information about the user who has transmitted the print job 24 to the print server 14 may be associated with the print job 24. A user database (DB) (not shown) in which a user ID for identifying each user and notification-destination information about the user are associated with each other is stored in the memory 22 of the print server 14. A print-job managing unit 30 is capable of identifying the notification-destination information about the user who has transmitted the print job 24 to the print server 14 based on a user ID identified in accordance with a user authentication process performed prior to reception of the print job 24 and the user DB. Alternatively, the user may transmit user's own notification destination together with the print job 24 to the print server 14. Although a user's email address is used as the notification-destination information in the example in FIG. 3, the notification-destination information is not limited thereto.

A processor 28 refers to hardware in a broad sense and includes at least one of a general processor (e.g., CPU: Central Processing Unit) and a dedicated processor (e.g., GPU: Graphics Processing Unit, ASIC: Application Specific Integrated Circuit, FPGA: Field Programmable Gate Array, and programmable logic device). The processor 28 is broad enough to encompass one processor or plural processors in collaboration which are located physically apart from each other but may work cooperatively. As shown in FIG. 2, the processor 28 functions as a print-job managing unit 30 and a billing unit 32.

The print-job managing unit 30 executes a process related to management of the print job 24. For example, when the print-job managing unit 30 receives the print job 24 from the user terminal 12, the print-job managing unit 30 causes the memory 22 to store the print job 24, gives a number to the job ID of the print job 24, and adds the job ID and a print deadline in association with each other to the server deadline management table 26. As mentioned above, the print-job managing unit 30 may add a notification deadline and notification-destination information to the server deadline management table 26 in association with each job ID.

The print-job managing unit 30 transmits the print job 24 to the image forming apparatus 16. As will be described later, in this exemplary embodiment, the image forming apparatus 16 inquires the print server 14 periodically (e.g., every minute) about whether or not a print job 24 not transmitted to the image forming apparatus 16 yet (referred to as "non-transmitted print job 24" in this description) is stored in the memory 22. In this description, this process will be referred to as "polling". In response to the polling from the image forming apparatus 16, if the non-transmitted print job 24 is stored in the memory 22, the print-job managing unit 30 transmits the print job 24 to the image forming apparatus 16. Alternatively, regardless of the polling from the image forming apparatus 16, the print-job managing unit 30 may immediately transmit the print job 24 to the image forming apparatus 16 after receiving the print job 24 from the user terminal 12. After transmitting the print job 24 to the image forming apparatus 16, the print-job managing unit 30 retains the print job 24 in the memory 22. The transmitted print job 24 may be given a transmitted flag to identify that the print job 24 has been transmitted to the image forming apparatus 16.

If the print server 14 corresponds with multiple image forming apparatuses 16, the print job 24 is given information indicating an image forming apparatus 16 that is designated by, for example, a user and that is to execute the printing process related to the print job 24. In this case, the image forming apparatus 16 transmits an apparatus ID for identifying the image forming apparatus 16 in addition to performing polling. The print-job managing unit 30 may transmit, to the image forming apparatus 16, a non-transmitted print job 24 corresponding to the polling and given information indicating the image forming apparatus 16.

When the image forming apparatus 16 completes a printing process related to the print job 24 acquired from the print server 14, the image forming apparatus 16 transmits the job ID of the print job 24 and a printing completion notification to the print server 14. When the billing unit 32 receives the job ID and the printing completion notification from the image forming apparatus 16, the billing unit 32 identifies the print job 24 stored in the memory 22 based on the received job ID. Then, the billing unit 32 executes a billing process related to the printing process of the print job 24 on the user who has transmitted the print job 24 to the print server 14 in accordance with print attributes (such as the printing sheet size, the number of copies to be printed, and the color setting (monochrome/color)) of the identified print job 24. Since the billing process is executable using any of various methods in the related art, a detailed description of the billing process will be omitted.

Upon completion of the billing process by the billing unit 32, the print-job managing unit 30 deletes the print job 24 from the memory 22 and also deletes the record related to the print job 24 from the server deadline management table 26.

As mentioned above, a print deadline is set for each print job 24. If the print deadline for the print job 24 is reached without the printing process related to the print job 24 being executed, the print-job managing unit 30 deletes the print job 24 from the memory 22. Therefore, supposing that a certain print job 24 is transmitted to the image forming apparatus 16 by the print-job managing unit 30 before the print deadline for the print job 24, the print job 24 is deleted by the print-job managing unit 30 when the print deadline for the print job 24 is reached, and the printing process related to the print job 24 is subsequently executed in the image forming apparatus 16 after the print deadline has passed, the billing unit 32 is not able to identify the print job 24 indicated by the job ID received together with a printing completion notification from the image forming apparatus 16 since the print job 24 has already been deleted. Accordingly, the billing unit 32 is not able to perform the billing process. The image forming system 10 according to this exemplary embodiment suppresses such a situation where the billing process is not executable.

Figure 4:
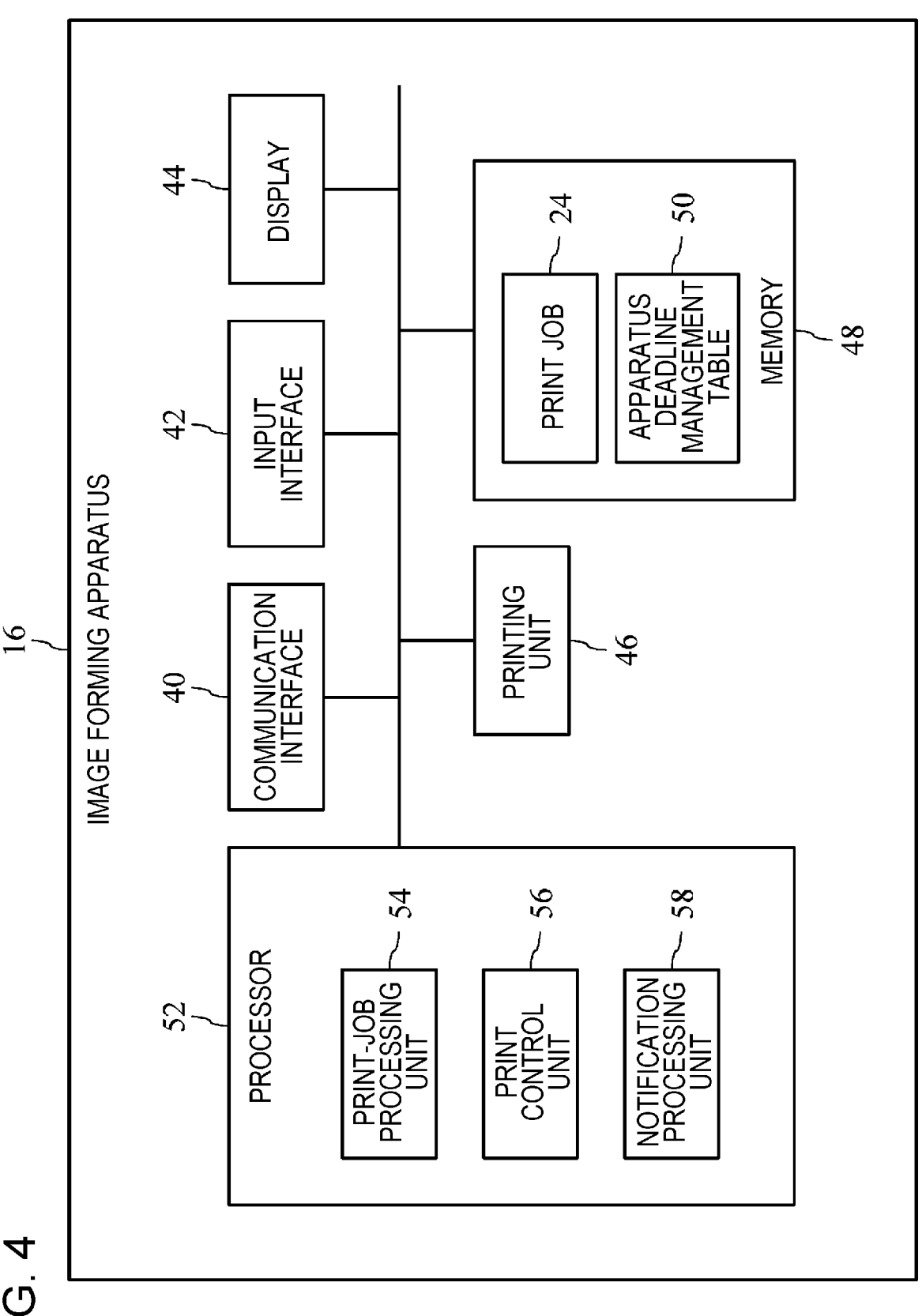
FIG. 4 schematically illustrates the configuration of an image forming apparatus according to this exemplary embodiment.

FIG. 4 schematically illustrates the configuration of the image forming apparatus 16. The image forming apparatus 16 has a printing function for printing an image onto a printing medium, such as paper. Examples of the image forming apparatus 16 include a multifunction apparatus and a printer.

A communication interface 40 includes, for example, a network interface card (NIC). The communication interface 40 exhibits a function for communicating with the user terminal 12 and the print server 14 via the communication line 18.

An input interface 42 includes, for example, various types of buttons and/or a touchscreen. The input interface 42 is used for inputting a command from the user to the image forming apparatus 16.

A display 44 includes, for example, a liquid crystal panel or an organic electroluminescence (EL) panel. The display 44 displays various screens in accordance with control by a processor 52 to be described later.

A printing unit 46 is, for example, a laser printer or an inkjet printer and performs a printing process for forming an image onto a printing medium, such as paper, based on the print job 24 acquired from the print server 14. If the printing unit 46 is a laser printer, the printing unit 46 is constituted of, for example, a photoconductor drum, a charging roller, a transfer roller, a fixing roller, and toner. If the printing unit 46 is an inkjet printer, the printing unit 46 is constituted of, for example, nozzles, a charging electrode plate, a deflecting electrode plate, and ink.

A memory 48 includes, for example, an HDD, an SSD, an eMMC, a ROM, or a RAM. The memory 48 has stored therein an image forming program for causing each unit of the image forming apparatus 16 to operate. The image forming program may be stored in, for example, a non-transitory computer readable storage medium, such as a universal serial bus (USB) memory or a CD-ROM. The image forming apparatus 16 may read the image forming program from such a storage medium and execute the image forming program. Furthermore, as shown in FIG. 4, the memory 48 has stored therein the print job 24 acquired from the print server 14 and an apparatus deadline management table 50. The contents of the apparatus deadline management table 50 may be the same as the contents of the server deadline management table 26 shown in FIG. 3. A method for adding data to the apparatus deadline management table 50 will be described later together with a process performed by the processor 52 (i.e., a print-job processing unit 54).

The processor 52 refers to hardware in a broad sense and includes at least one of a general processor (e.g., CPU) and a dedicated processor (e.g., GPU, ASIC, FPGA, and programmable logic device). The processor 52 is broad enough to encompass one processor or plural processors in collaboration which are located physically apart from each other but may work cooperatively. The processor 52 controls each unit of the image forming apparatus 16. In particular, the processor 52 functions as the print-job processing unit 54, a print control unit 56, and a notification processing unit 58 in accordance with the image forming program stored in the memory 48.

The print-job processing unit 54 acquires the print job 24 and the job ID of the print job 24 from the print server 14. In this exemplary embodiment, the print-job processing unit 54 performs polling periodically (e.g., every minute) on the print server 14 so as to acquire the print job 24 and the job ID of the print job 24 from the print server 14. The print-job processing unit 54 causes the memory 48 to store the acquired print job 24.

The print-job processing unit 54 stores the print deadline for the print job 24 received from the print server 14 in the apparatus deadline management table 50 in association with the job ID of the print job 24 received from the print server 14. If the print deadline is set to the time point corresponding to the first predetermined time period after the print server 14 receives the print job 24 from the user terminal 12, the print-job processing unit 54 may set the time point corresponding to the first predetermined time period after the print job 24 is received from the print server 14 as the print deadline for the print job 24. Technically speaking, the time point at which the print server 14 receives the print job 24 from the user terminal 12 and the time point at which the image forming apparatus 16 receives the print job 24 from the print server 14 may be different from each other. However, in this exemplary embodiment, the print-job processing unit 54 performs polling on the print server 14 at very short interval, such as every minute. Therefore, the time point at which the print server 14 receives the print job 24 from the user terminal 12 and the time point at which the image forming apparatus 16 receives the print job 24 from the print server 14 may be regarded as the same time point. In other words, the print deadline for the print job 24 may be set as the time point corresponding to the first predetermined time period after the print job 24 is received from the print server 14.

If the print deadline for the print job 24 is individually set by the user, the print-job managing unit 30 of the print server 14 transmits the print deadline for the print job 24 together with the print job 24 to the image forming apparatus 16 in response to the polling from the image forming apparatus 16. The print-job processing unit 54 may identify the print deadline for the print job 24 based on information received from the print server 14.

The print-job processing unit 54 may store the notification deadline for the print job 24 received from the print server 14 in the apparatus deadline management table 50 in association with the job ID of the print job 24. If the notification deadline is set to the time point corresponding to the second predetermined time period prior to the print deadline, the print-job processing unit 54 may set the time point corresponding to the second predetermined time period prior to the print deadline for the print job 24, identified as described above, as the notification deadline. If the notification deadline for the print job 24 is individually set by the user, the print-job managing unit 30 of the print server 14 transmits the notification deadline for the print job 24 together with the print job 24 to the image forming apparatus 16 in response to the polling from the image forming apparatus 16. The print-job processing unit 54 may identify the notification deadline for the print job 24 based on information received from the print server 14.

Furthermore, the print-job processing unit 54 may store the notification-destination information about the user who has transmitted the print job 24 received from the print server 14 to the print server 14 in the apparatus deadline management table 50 in association with the job ID of the print job 24. The print-job managing unit 30 of the print server 14 transmits the notification-destination information associated with the print job 24 together with the print job 24 to the image forming apparatus 16 in response to the polling from the image forming apparatus 16. The print-job processing unit 54 may identify the notification-destination information associated with the print job 24 based on information received from the print server 14.

As mentioned above, if the print deadline is set to the time point corresponding to the first predetermined time period after the print server 14 receives the print job 24 from the user terminal 12, the first predetermined time period may be variable in response to a request from the image forming apparatus 16. In this case, a manager or a user of the image forming apparatus 16 preliminarily designates a desired first predetermined time period to the image forming apparatus 16. Then, the print-job processing unit 54 also transmits time indication information indicating the designated first predetermined time period to the print server 14 during the polling. Accordingly, the print-job managing unit 30 of the print server 14 may set, as the print deadline for the print job 24, the time point corresponding to the first predetermined time period, indicated in the time indication information received from the image forming apparatus 16, after the time point at which the print job 24 is received from the user terminal 12. Furthermore, the print-job processing unit 54 of the image forming apparatus 16 may set, as the print deadline for the print job 24, the time point corresponding to the first predetermined time period, designated by the manager or the user of the image forming apparatus 16, after the time point at which the print job 24 is received from the print server 14.

The print control unit 56 causes the printing unit 46 to execute a printing process related to the print job 24 (for the sake of convenience, this will be expressed as "the print control unit 56 executes a printing process"). After receiving the print job 24 from the print server 14, the print control unit 56 retains the print job 24 in the memory 48 instead of immediately executing the printing process related to the print job 24. After the print control unit 56 receives the print job 24 from the print server 14, if there is an execution order from the user who has transmitted the print job 24 to the print server 14 in a state where the print job 24 stored in the memory 48 is designated, the print control unit 56 executes the printing process related to the print job 24. The execution order from the user is input from, for example, the input interface 42. Upon completion of the printing process related to the print job 24, the print control unit 56 transmits the job ID of the print job 24 and a printing completion notification to the print server 14, deletes the print job 24 from the memory 48, and deletes the record related to the print job 24 from the apparatus deadline management table 50.

As mentioned above, the print job 24 is provided with a print deadline. If the print control unit 56 receives an execution order for the print job 24 after the print deadline for the print job 24 has passed, the print control unit 56 does not execute the printing process related to the print job 24.

In this exemplary embodiment, the print control unit 56 deletes the print job 24 from the memory 48 when the print deadline for the print job 24 is reached. Accordingly, the user is no longer able to input an execution order for the print job 24 to the image forming apparatus 16 after the print deadline for the print job 24 has passed, so that the printing process of the print job 24 is not executable.

Alternatively, while retaining the print job 24 in the memory 48 even after the print deadline for the print job 24 has passed, the print control unit 56 may neglect the execution order for the print job 24 input by the user and not execute the printing process related to the print job 24.

As mentioned above, when the print deadline for the print job 24 is reached, the print job 24 is deleted from the memory 22 of the print server 14. If the printing process related to the print job 24 is subsequently executed, there is a problem in that a billing process related to the print job 24 is not executable. According to this exemplary embodiment, the print control unit 56 does not execute the printing process related to the print job 24 after the print deadline for the print job 24 has passed. Therefore, a situation where the billing unit 32 of the print server 14 is not able to execute the billing process for the printing process related to the print job 24 may be suppressed.

If the notification processing unit 58 does not receive an execution order for the print job 24 from the user before the notification deadline for the print job 24 received from the print server 14 is reached, the notification processing unit 58 provides a notification to the user who has transmitted the print job 24 to the print server 14. In detail, when the notification deadline for the print job 24 is reached, the notification processing unit 58 refers to the apparatus deadline management table 50 and identifies the notification-destination information associated with the job ID of the print job 24 in the apparatus deadline management table 50. Then, a notification is transmitted to the identified notification-destination information. As mentioned above, a notification deadline is set to a time point prior to a print deadline. Therefore, the user may be able to receive a notification before the print deadline.

The user who has received the notification may conceivably desire to extend the print deadline. In this case, the user selects the print job 24 from the user terminal 12 via the communication interface 40 or from the input interface 42 and inputs a deadline extension command for extending the print deadline for the print job 24 to the image forming apparatus 16. The deadline extension command includes information indicating a new print deadline (indicating a time point subsequent to the original print deadline) for the print job 24.

Then, based on the deadline extension command, the print-job processing unit 54 updates the print deadline for the print job 24 in the apparatus deadline management table 50. If the notification deadline is set to the time point corresponding to the second predetermined time period prior to the print deadline, the notification deadline for the print job 24 may also be updated.

Furthermore, the print-job processing unit 54 transmits the job ID of the print job 24 and the deadline extension command to the print server 14. Based on the received deadline extension command, the print-job managing unit 30 of the print server 14 updates the print deadline for the print job 24 in the server deadline management table 26. If the notification deadline is set to the time point corresponding to the second predetermined time period prior to the print deadline, the notification deadline for the print job 24 may also be updated.

If the user who has transmitted the print job 24 to the print server 14 determines that a billing process may be performed when the print deadline for the print job 24 is reached without execution of the printing process related to the print job 24, the user transmits the print job 24 with a billing permission command added thereto to the print server 14.

If the print deadline for the print job 24 is reached without execution of the printing process related to the print job 24 having the billing permission command added thereto, the billing unit 32 executes a billing process related to the print job 24. With regard to the print job 24 having the billing permission command added thereto, the print control unit 56 of the image forming apparatus 16 receives an execution order from the user even after the print deadline for the print job 24 has passed. In other words, in this case, the printing process related to the print job 24 is executable even after the print deadline.

In a case where the printing process related to the print job 24 having the billing permission command added thereto is not executed, a billing process related to the print job 24 not having undergone the printing process is still performed on the user. Therefore, if the print deadline for the print job 24 is reached without execution of the printing process related to the print job 24 having the billing permission command added thereto and the billing process is subsequently performed, the billing unit 32 may cancel the billing process and instead charge for another print job 24 from the user who has transmitted the print job 24 to the print server 14. In detail, after a certain user transmits a certain print job 24 to the print server 14 and a billing process is performed without execution of a printing process related to the print job 24, if the same user commands execution of a printing process related to another print job 24 having print attributes similar to those of the print job 24, the billing unit 32 does not perform a billing process for the printing process related to the latter print job 24.

Figure 5:
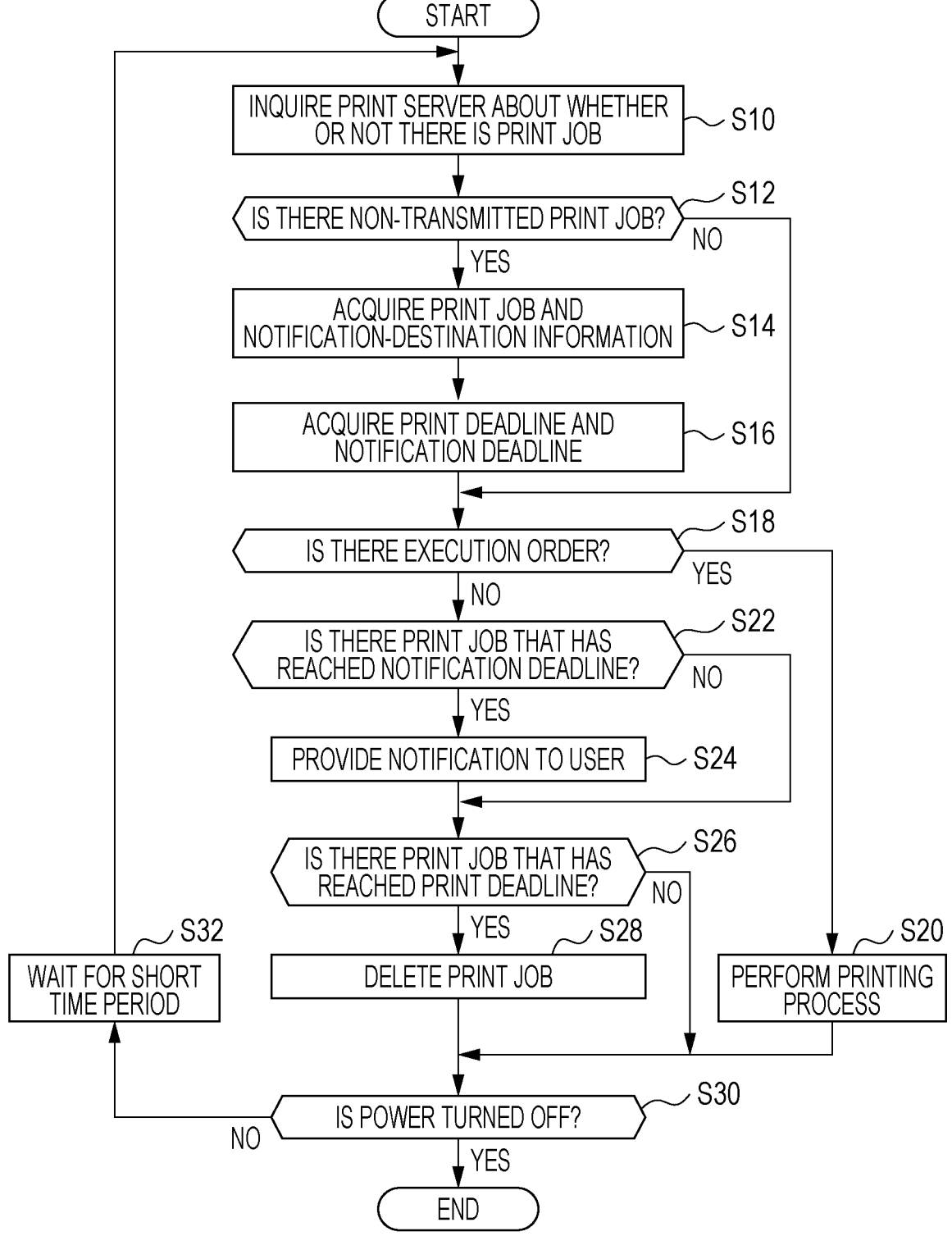
FIG. 5 is a flowchart illustrating the flow of a process performed by the image forming apparatus according to this exemplary embodiment.

The overview of the configuration of the image forming system 10 according to this exemplary embodiment is as follows. The flow of a process performed by the image forming apparatus 16 will be described below with reference to a flowchart shown in FIG. 5.

In step S10, the print-job processing unit 54 performs polling on the print server 14.

In step S12, the print-job managing unit 30 of the print server 14 determines whether or not a non-transmitted print job 24 not transmitted to the image forming apparatus 16 yet is stored in the memory 22. If the non-transmitted print job 24 is stored in the memory 22, the process proceeds to step S14. If the print job 24 is not stored in the memory 22, the process proceeds to step S18 while bypassing step S14 to step S16.

In step S14, the print-job managing unit 30 of the print server 14 transmits, to the image forming apparatus 16, the non-transmitted print job 24, a job ID of the print job 24, and notification-destination information about a user who has transmitted the print job 24 to the print server 14. Accordingly, the print-job processing unit 54 acquires the print job 24, the job ID of the print job 24, and the notification-destination information. The print-job processing unit 54 causes the memory 48 to store the acquired print job 24.

In step S16, the print-job processing unit 54 acquires a print deadline for the print job 24 acquired in step S14. For example, a time point corresponding to the first predetermined time period after the reception time point of the print job 24 is set as the print deadline. Moreover, the print-job processing unit 54 acquires a notification deadline for the print job 24 acquired in step S14. For example, a time point corresponding to the second predetermined time period prior to the print deadline is set as the notification deadline. Then, the print-job processing unit 54 adds the job ID acquired in step S14, the print deadline, the notification deadline, and the notification-destination information acquired in step S14 to the apparatus deadline management table 50 in association with one another.

In step S18, the print control unit 56 determines whether or not an execution order is received from the user who has transmitted the print job 24 to the print server 14. If an execution order is received from the user, the process proceeds to step S20. In step S20, the print control unit 56 executes a printing process related to the print job 24. Upon completion of the printing process, the print control unit 56 transmits the job ID of the print job 24 and a printing completion notification to the print server 14. In response to this, the billing unit 32 of the print server 14 executes a billing process related to the print job 24.

If an execution order is not received from the user, the process proceeds to step S22.

In step S22, the notification processing unit 58 refers to the apparatus deadline management table 50 and determines whether or not there is a print job 24 having reached the notification deadline among print jobs 24 stored in the memory 48. If there is a print job 24 having reached the notification deadline, the process proceeds to step S24. If there is no print job 24 having reached the notification deadline, the process proceeds to step S26 while bypassing step S24.

In step S24, the notification processing unit 58 refers to the apparatus deadline management table 50, identifies the notification-destination information associated with the job ID of the print job 24, and provides a notification to the user who has transmitted the print job 24 to the print server 14 based on the identified notification-destination information.

In step S26, the print control unit 56 refers to the apparatus deadline management table 50 and determines whether or not there is a print job 24 having reached the print deadline among the print jobs 24 stored in the memory 48.

If there is a print job 24 having reached the print deadline, the process proceeds to step S28. If there is no print job 24 having reached the print deadline, the process proceeds to step S30 while bypassing step S28.

In step S28, the print control unit 56 deletes the print job 24 determined to have reached the print deadline in step S26 from the memory 48. Accordingly, a printing process related to this print job 24 is not executed hereafter. In addition, the print-job managing unit 30 of the print server 14 deletes this print job 24 from the memory 22.

In step S30, if the image forming apparatus 16 is in an on mode, the process proceeds to step S32. In step S32, the print-job processing unit 54 waits for a short time period (e.g., 1 minute), and then returns to step S10. If the image forming apparatus 16 is turned off, the process ends.

The above exemplary embodiment according to the disclosure is not limited to that described above, and various modifications are permissible so long as they do not depart from the scope of the exemplary embodiment of the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (1)

An image forming apparatus comprising:

a processor configured to:

retain a print command having a print deadline set therefor and received from a user, execute a billing process related to a printing process when the printing process related to the print command is completed in the image forming apparatus that has acquired the print command, and be communicable with a print server that deletes the print command if the printing process related to the print command is not executed before the print deadline is reached;

receive the print command from the print server and cause a memory to store the print command; and not execute the printing process related to the print command if an execution order for the print command is received after the print deadline for the print command received from the print server has passed.

(2)

The image forming apparatus according to (1), wherein the processor is configured to delete the print command from the memory when the print deadline for the print command received from the print server is reached.

(3)

The image forming apparatus according to (1), wherein the print deadline for the print command is a time point corresponding to a predetermined time period after the print server receives the print command, and wherein the predetermined time period is set based on time indication information transmitted from the processor to the print server.

(4)

The image forming apparatus according to (1), wherein the print command has a notification deadline set therefor, the notification deadline being a time point prior to the print deadline, wherein the processor is configured to:

receive notification-destination information from the print server, the notification-destination information indicating a notification destination of the user who has transmitted the print command to the print server; and provide a notification to the user who has transmitted the print command to the print server based on the notification-destination information if an execution order for the print command is not received before the notification deadline for the print command received from the print server is reached.

(5)

The image forming apparatus according to (4), wherein the processor is configured to transmit a deadline extension command for extending the print deadline for the print command to the print server in response to a command from the user provided with the notification.

(6)

An image forming program causing a computer to execute a process, the process comprising:

retaining a print command having a print deadline set therefor and received from a user, executing a billing process related to a printing process when the printing process related to the print command is completed in an image forming apparatus that has acquired the print command, and communicating with a print server that deletes the print command if the printing process related to the print command is not executed before the print deadline is reached;

receiving the print command from the print server and causing a memory to store the print command; and not causing the printing process related to the print command to be executed if an execution order for the print command is received after the print deadline for the print command received from the print server has passed.

What is claimed is:

1. An image forming apparatus comprising:

a processor configured to:

retain a print command having a print deadline set therefor and received from a user, execute a billing process related to a printing process when the printing process related to the print command is completed in the image forming apparatus that has acquired the print command, and be communicable with a print server that deletes the print command if the printing process related to the print command is not executed before the print deadline is reached;

receive the print command from the print server and cause a memory to store the print command; and not execute the printing process related to the print command if an execution order for the print command is received after the print deadline for the print command received from the print server has passed.

2. The image forming apparatus according to claim 1, wherein the processor is configured to delete the print command from the memory when the print deadline for the print command received from the print server is reached.

3. The image forming apparatus according to claim 1, wherein the print deadline for the print command is a time point corresponding to a predetermined time period after the print server receives the print command, and wherein the predetermined time period is set based on time indication information transmitted from the processor to the print server.

4. The image forming apparatus according to claim 1, wherein the print command has a notification deadline set therefor, the notification deadline being a time point prior to the print deadline, wherein the processor is configured to:

receive notification-destination information from the print server, the notification-destination information indicating a notification destination of the user who has transmitted the print command to the print server; and provide a notification to the user who has transmitted the print command to the print server based on the notification-destination information if an execution order for the print command is not received before the notification deadline for the print command received from the print server is reached.

5. The image forming apparatus according to claim 4, wherein the processor is configured to transmit a deadline extension command for extending the print deadline for the print command to the print server in response to a command from the user provided with the notification.

6. A non-transitory computer readable medium storing a program causing a computer to execute a process for forming an image, the process comprising:

retaining a print command having a print deadline set therefor and received from a user, executing a billing process related to a printing process when the printing process related to the print command is completed in an image forming apparatus that has acquired the print command, and communicating with a print server that deletes the print command if the printing process related to the print command is not executed before the print deadline is reached;

receiving the print command from the print server and causing a memory to store the print command; and not causing the printing process related to the print command to be executed if an execution order for the print command is received after the print deadline for the print command received from the print server has passed.

7. An image forming method comprising:

retaining a print command having a print deadline set therefor and received from a user, executing a billing process related to a printing process when the printing process related to the print command is completed in an image forming apparatus that has acquired the print command, and communicating with a print server that deletes the print command if the printing process related to the print command is not executed before the print deadline is reached;

receiving the print command from the print server and causing a memory to store the print command; and not causing the printing process related to the print command to be executed if an execution order for the print command is received after the print deadline for the print command received from the print server has passed.

* * * * *